(12) United States Patent
Gumprecht et al.

(10) Patent No.: US 10,773,675 B2
(45) Date of Patent: Sep. 15, 2020

(54) VEHICLE SEAT

(71) Applicant: FAURECIA AUTOSITZE GMBH, Stadthagen (DE)

(72) Inventors: Michael Gumprecht, Nassenfels (DE); Bernd Römer, Stadthagen (DE)

(73) Assignee: Faurecia Autositze GMBH, Stadthagen (DE)

( * ) Notice: Subject to any disclaimer, the term of this patent is extended or adjusted under 35 U.S.C. 154(b) by 59 days.

(21) Appl. No.: 16/254,664

(22) Filed: Jan. 23, 2019

(65) Prior Publication Data

US 2019/0225177 A1    Jul. 25, 2019

(30) Foreign Application Priority Data

Jan. 25, 2018 (DE) .................. 10 2018 101 706

(51) Int. Cl.
*B60R 21/207* (2006.01)
*B60R 21/231* (2011.01)
*B60N 2/22* (2006.01)
*B60N 2/838* (2018.01)

(52) U.S. Cl.
CPC .............. *B60R 21/207* (2013.01); *B60N 2/22* (2013.01); *B60N 2/2222* (2013.01); *B60N 2/838* (2018.02); *B60R 21/23138* (2013.01); *B60R 2021/23146* (2013.01)

(58) Field of Classification Search
CPC ............ B60R 21/207; B60R 21/23138; B60R 2021/23146; B60N 2/22; B60N 2/2222; B60N 2/838
See application file for complete search history.

(56) References Cited

U.S. PATENT DOCUMENTS

| 4,822,102 A * | 4/1989 | Duvenkamp | B60N 2/874 297/403 |
| 4,865,388 A * | 9/1989 | Nemoto | B60N 2/888 297/403 |
| 4,934,755 A * | 6/1990 | Berghoff | B60N 2/0232 297/284.1 |
| 5,738,407 A * | 4/1998 | Locke | B60R 21/207 280/730.1 |
| 5,795,019 A * | 8/1998 | Wieclawski | B60N 2/2222 297/216.12 |
| 5,833,312 A * | 11/1998 | Lenz | B60N 2/427 297/216.13 |
| 5,927,804 A * | 7/1999 | Cuevas | B60N 2/888 297/216.12 |
| 6,019,424 A * | 2/2000 | Ruckert | B60N 2/2222 297/216.12 |

(Continued)

FOREIGN PATENT DOCUMENTS

| DE | 102005035753 A1 | 5/2006 |
| IE | 19614314 A1 | 10/1996 |
| WO | 2007077035 A1 | 7/2007 |

*Primary Examiner* — Drew J Brown
(74) *Attorney, Agent, or Firm* — Barnes & Thornburg LLP

(57) ABSTRACT

A vehicle seat includes a seat portion and a back rest coupled to the seat portion to extend upwardly away from the seat portion. The back rest includes a base frame coupled to the seat bottom to extend upwardly therefrom and a head frame coupled to the base frame to locate the base frame between the seat portion and the head frame. The vehicle seat further includes an airbag coupled to the back rest.

13 Claims, 1 Drawing Sheet

(56) References Cited

U.S. PATENT DOCUMENTS

| | | | | |
|---|---|---|---|---|
| 6,022,074 | A * | 2/2000 | Swedenklef | B60N 2/2222 297/216.14 |
| 6,024,406 | A * | 2/2000 | Charras | B60N 2/2222 297/216.14 |
| 6,135,561 | A * | 10/2000 | Kruger | B60R 22/185 297/408 |
| 6,402,238 | B1 * | 6/2002 | Bigi | B60N 2/427 297/216.12 |
| 6,568,754 | B1 * | 5/2003 | Norton | B60R 21/207 297/216.12 |
| 6,805,404 | B1 * | 10/2004 | Breed | B60N 2/002 297/216.12 |
| 7,097,242 | B2 * | 8/2006 | Farquhar | B60N 2/4228 297/216.12 |
| 7,845,729 | B2 * | 12/2010 | Yamada | B60N 2/0232 297/284.1 |
| 7,946,614 | B2 | 5/2011 | Breuninger | |
| 8,899,683 | B2 | 12/2014 | Ito | |
| 2003/0030316 | A1 * | 2/2003 | Cho | B60N 2/888 297/408 |
| 2006/0022439 | A1 | 2/2006 | Bayley | |
| 2009/0200774 | A1 * | 8/2009 | Nam | B60R 21/23138 280/730.2 |
| 2009/0200775 | A1 * | 8/2009 | Sugimoto | B60R 21/26 280/730.2 |
| 2010/0244525 | A1 * | 9/2010 | Ito | B60N 2/0232 297/353 |
| 2017/0136976 | A1 * | 5/2017 | Ohno | B60R 21/262 |

* cited by examiner

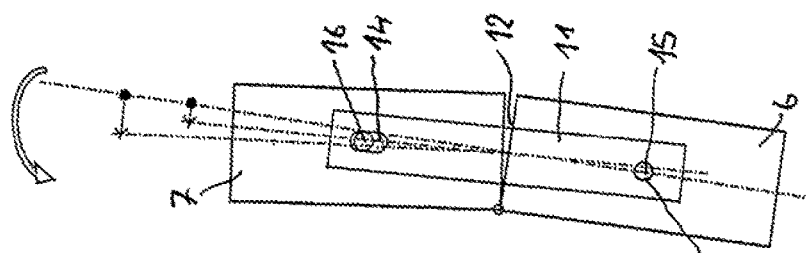
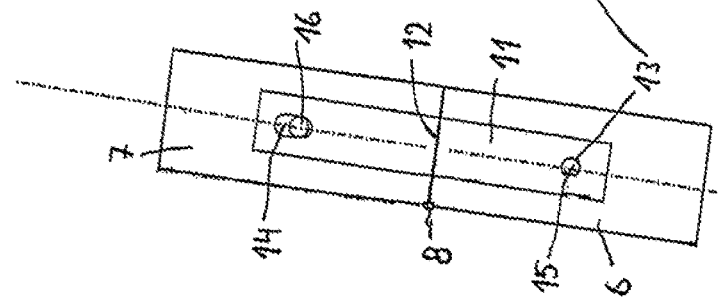
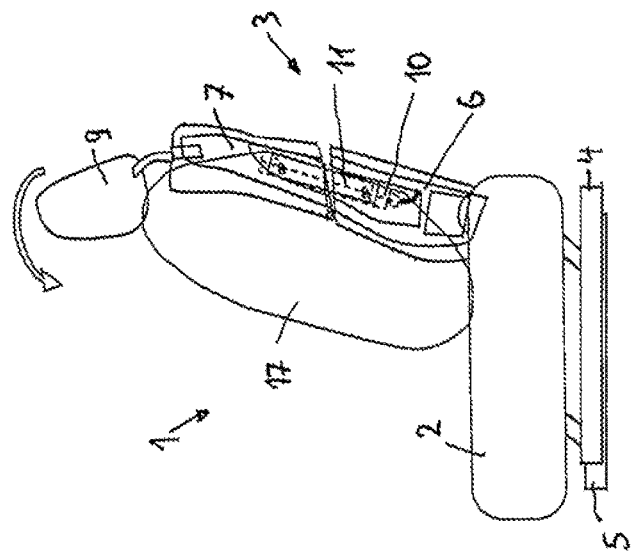
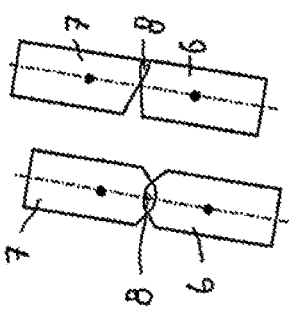
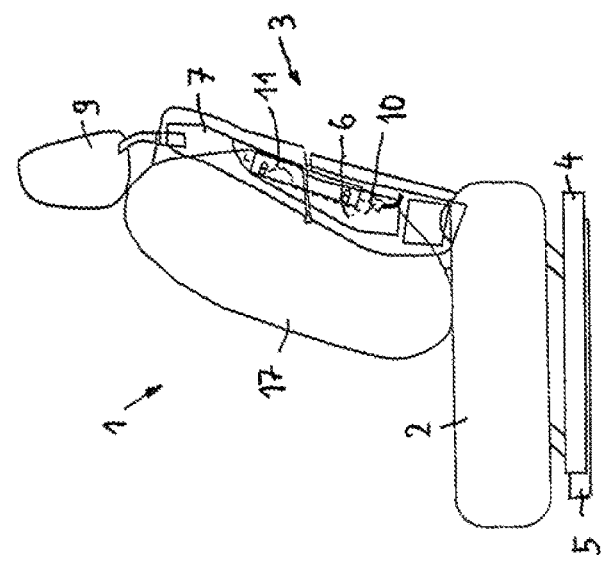
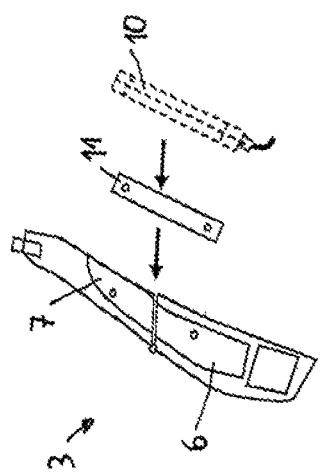

VEHICLE SEAT

PRIORITY CLAIM

This application claims priority to German Application Serial No. DE102018101706.5, filed Jan. 25, 2018, which is expressly incorporated by reference herein.

BACKGROUND

The present disclosure relates to an occupant support, and particularly to an occupant support used in a vehicle. More particularly, the present disclosure relates to a vehicle seat including a backrest.

SUMMARY

According to the present disclosure, a vehicle seat includes a seat portion and a back rest coupled to the seat portion to extend upwardly away from the seat portion. The back rest includes a base frame coupled to the seat bottom to extend upwardly therefrom and a head frame coupled to the base frame to locate the base frame between the seat portion and the head frame.

In illustrative embodiments, the head frame is coupled to the base frame to tilt about an axis. The vehicle seat further comprises an airbag module arranged to extend between and interconnect the head frame and the base frame to cause airbag module to move with the head frame relative to the seat portion.

In illustrative embodiments, the airbag module includes a first end coupled to the base frame to pivot about a lower axis and an upper end coupled to the head frame to pivot and translate relative to the head frame.

In illustrative embodiments, the airbag module is formed to include a circular aperture on a first end and an elongate slot on an opposite second end. A first bolt coupled to the base frame in a fixed position relative to the base frame is arranged to extend into the circular aperture to provide the lower axis. A second bolt coupled to the head frame in a fixed position relative to the head frame is arranged to extend into the elongate slot to allow translational and pivotable movement of the head frame relative to the base frame.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a schematic side view of a vehicle seat with a back rest in a default position and with deployed lateral airbag;

FIG. 2 is a representation according to FIG. 1 where the head frame of the back rest is adjusted to a forward position;

FIG. 3 is an exploded view of rest frame, beam, and airbag module;

FIG. 4 is a schematic representation of a joint between base frame and head frame in the default position according to FIG. 1;

FIG. 5 is a schematic representation similar to FIG. 4 with a head frame adjusted to a forward position according to FIG. 2; and FIG. 6 is a set of schematic representations showing further options for the arrangement of a joint between head frame and base frame.

DETAILED DESCRIPTION

The drawing shown in the FIGS. 1 and 2 is a vehicle seat 1 having a seating portion 2 and a back rest 3 attached thereto. The vehicle seat 1 is mounted on a vehicle floor—not shown—in a way so that it can be longitudinally adjusted via pairs of rails provided on both sides, each comprising an upper rail 4 and lower rail 5. Hereby, the upper rails 4 are affixed to the seating portion 2 and the lower rails 5 to the vehicle floor.

The frame of the back rest 3 is split in two parts. It comprises a base frame 6 affixed to the seating portion 2 as well as a head frame 7 mounted on the base frame 6 in such a way that it can be adjusted in tilt. To that end, in the embodiment according to FIGS. 1-5, a hinge 8 is arranged between the base frame 6 and the head frame 7 at the front side of these. At its upper end the head frame 7 accommodates a head rest 9.

An airbag module 10 is built into the back rest 3 and connected firmly to a beam 11. In the built-in state the beam 11 and thereby also the airbag module 10 bridges a joint 12 formed due to the fact that the head frame 7 is coupled articulatedly with the base frame 6.

At its end associated with the base frame 6 the beam 11 is provided with a circular hole 13 and, at its end associated with the head frame 7, with an elongated hole 14, as can be seen from FIGS. 4 and 5. The hole 13 is penetrated by a stud bolt 15 firmly affixed to the base frame, and the elongated hole 14 is penetrated by a stud bolt 16 firmly affixed to the head frame. When the head frame 7 is adjusted the beam 11 rotates about the stud bolt 15 firmly affixed to the base frame thereby changing the distance between the stud bolt 15 firmly affixed to the base frame and the stud bolt 16 firmly affixed to the head frame. This change is compensated by shifting the stud bolt 16 firmly affixed to the head frame inside the elongated hole 14. This is shown in FIGS. 4 and 5 for a case where the head frame 7 has been adjusted forward whereby FIG. 4 shows the situation with the head frame 7 being in the default position and FIG. 5 the situation with the head frame 7 being adjusted forward to the maximum. This arrangement allows the beam 11 and thereby the airbag module 10 to follow the pivoting movement of the head frame 7 when the head frame 7 is adjusted relative to the base frame 6. Hereby, a deployed airbag 17 (see FIGS. 1 and 2) will have an associated position at any position the head frame 7 is adjusted to, where both the thorax region as well as the abdominal region of a seat occupant are protected by the airbag being in the associated position. In the schematic representations according to FIGS. 4 and 5 the airbag module 10 is not shown. The same applies to the FIG. 6.

In the above-described embodiment example, the beam 11 and the airbag module 10 are designed as separate components. In a further embodiment example, the beam 11 may be an integral component of the airbag module 10 thereby reducing the number of components.

In FIG. 6, alternatives for the arrangement of a hinge 8 between the base frame 6 and the head frame 7 are shown.

A vehicle seat 1 comprises a back rest 3 including a base frame 6 and a head frame 7. The base frame 6 is connected to a seating portion 2 and the head frame 7 is mounted, via a pivot joint 8 provided on each side of the seat, on the base frame 6 in such a way that its can be tilt adjusted, and an airbag module 10 built into the back rest 3. The airbag module 10 is connected to a beam 11 which, together with the airbag module 10, bridges a joint 12 formed as a result of the articulated connection of the head frame 7 to the base frame 6. The beam 11 is connected at its end region pivotably to the base frame 6 and at its other end region pivotably and axially slidable to the head frame 7, in such a manner that the airbag module 10, being entrained by the beam 11, follows a tilt adjustment of the head frame 7.

In one comparative example, a vehicle seat may comprise only one airbag device. Comparative vehicle seats having only one airbag device have the airbag device is mounted either on the head frame thereby protecting primarily the thorax region of the occupant or, alternatively, on the base frame so that the airbag device protects the abdominal region of the occupant. To protect both regions, an additional airbag device may be used.

In another comparative example, a vehicle seat may comprise an airbag device for protecting the head and a further airbag device for protecting the thorax region of a seat occupant. Both airbag devices are mounted on the head frame thereby following any adjustment movement when the head frame is adjusted. In this example, in the event of a crash, the two air cushions deploy in a matter to protect the head and the thorax region of the seat occupant regardless of the position the head frame is adjusted to.

A vehicle seat in accordance with the present disclosure provides desired protection of the thorax region and the abdominal region of a seat occupant at any position the head frame is adjusted to using only one airbag device mounted in the back rest. This is accomplished by providing a vehicle seat comprising the features of the claim 1.

In the vehicle seat according to the present disclosure, due to the fact that the head frame is articulatedly coupled with the base frame, there exists a joint between these two components. The airbag module is connected to a beam bridging this joint. By virtue of this, the airbag module is affixed both to the base frame as well as to the head frame. To that end, the end region of the beam is pivotably connected to the base frame and the other end region is connected pivotably and axially pivotably to the head frame. Based on this connection the beam and, together with it, the airbag module follows the movement when the angle of the head frame is adjusted. Consequently, a deployed airbag will have, at any position the head frame is adjusted to, a desired position in which both the thorax region and the abdominal region of a seat occupant are protected.

The beam and the airbag module may be designed as separate components. In a further development of the present disclosure it is provided, however, to design the beam as an integral component of the airbag module. This one-piece design reduces the number of components.

The hinge connecting the head frame and the base frame is arranged on the front side of the back rest. In further embodiments of the present disclosure, however, it may alternatively be arranged on the back side of the back rest or, respectively, between the front side and the back side of the back rest.

The invention claimed is:

1. A vehicle seat comprising
a back rest including a base frame and a head frame, the base frame being connected to a seating portion and the head frame being mounted via a pivot joint provided on each side of the vehicle seat to the base frame in such a way that it can be tilt adjusted, and an airbag module being built into the back rest,
wherein the airbag module is connected to a beam which, together with the airbag module, bridges a joint formed as a result of the articulated connection of the head frame to the base frame, the beam being connected at its end region pivotally to the base frame and at its other end region pivotally and axially slidable to said head frame, in such a manner that the airbag module, being entrained by the beam, follows a tilt adjustment of the head frame.

2. The vehicle seat of claim 1, wherein the airbag module is designed as a single piece together with the beam.

3. The vehicle seat of claim 2, wherein the hinge is arranged at a front side of the backrest.

4. The vehicle seat of claim 2, wherein the hinge is arranged at a back side of the back rest.

5. The vehicle seat of claim 2, wherein the hinge is arranged between a front side and a back side of the backrest.

6. The vehicle seat of claim 1, wherein the hinge is arranged at a front side of the backrest.

7. The vehicle seat of claim 1, wherein the hinge is arranged at a back side of the back rest.

8. The vehicle seat of claim 1, wherein the hinge is arranged between a front side and a back side of the backrest.

9. A vehicle seat comprising
a seat portion and
a back rest comprising a base frame coupled to the seat portion to extend upwardly from the seat portion, a head frame coupled to the base frame to pivot about an axis, and a pivot joint configured to provide the axis and interconnect the head frame to the base frame, and
an airbag module comprising a beam arranged to extend between and interconnect the head frame and the base frame and an airbag coupled to the beam to move therewith,
wherein the beam is arranged to extend across the pivot joint and is coupled on a first end to the base frame to pivot about a lower axis and on a second end to the head frame to allow translation of the head frame relative to the beam.

10. The vehicle seat of claim 9, wherein the head frame pivots about an upper axis relative to the beam.

11. The vehicle seat of claim 10, wherein the upper axis translates relative to the base frame.

12. The vehicle seat of claim 9, wherein the beam is formed to include an elongated slot in the second end to allow for translating and pivoting movement of the head frame relative to the base frame.

13. The vehicle seat of claim 12, wherein the beam is formed to include a circular aperture in the first end.

* * * * *